United States Patent [19]
Hudson

[11] Patent Number: 5,085,449
[45] Date of Patent: Feb. 4, 1992

[54] CUTTER HAVING A SINGLE BLADE FOR A SAFETY BELT

[76] Inventor: William Hudson, 2723 Veteran Ave., Los Angeles, Calif. 90064

[21] Appl. No.: 608,848

[22] Filed: Nov. 5, 1990

[51] Int. Cl.$^5$ .......................... B60R 7/04; B26B 17/00
[52] U.S. Cl. ..................................... 280/801; 74/557; 30/175; 30/296.1; 30/298.4; 362/119
[58] Field of Search ............... 280/801, 808; 30/175, 30/186, 296.1, 298.4; 74/543; 362/119, 109; D8/57, 5, DIG. 3, 1, 10; 297/468, 483

[56] References Cited

U.S. PATENT DOCUMENTS

| | | | |
|---|---|---|---|
| 176,519 | 4/1876 | Does | 30/341 |
| D. 268,088 | 3/1983 | Bass | D8/57 |
| 2,254,738 | 9/1941 | Gamache | 30/175 |
| 2,610,399 | 9/1952 | Adams | 30/296.1 |
| 4,009,905 | 3/1977 | Bejeannin | 297/468 |
| 4,563,815 | 1/1986 | Hoffelner | 30/298.4 |
| 4,680,861 | 7/1987 | Meurer | 30/298.4 |
| 4,984,368 | 1/1991 | Hoover | 280/801 |

FOREIGN PATENT DOCUMENTS

| | | | |
|---|---|---|---|
| 70439 | 1/1983 | European Pat. Off. | 280/801 |
| 2826749 | 1/1980 | Fed. Rep. of Germany | 280/801 |

*Primary Examiner*—Charles A. Marmor
*Assistant Examiner*—Karin Tyson
*Attorney, Agent, or Firm*—Leon Gilden

[57] ABSTRACT

An apparatus wherein a unitary housing includes a "V" shaped slot defining an upper and lower planar wall, with an acute angle therebetween. The lower planar wall includes a blade member arranged essentially coextensively therewith, with the slot arranged for receiving a seat belt for emergency severing thereof. A plurality of hook and loop fasteners mounted to a first side wall of the housing is selectively and removably securable to a like plurality of hook and loop fasteners mounted to an associated seat belt. The organization may further include an illumination member mounted to a forward end wall of the housing operative through a switch for use with the organization during conditions of limited available light.

2 Claims, 3 Drawing Sheets

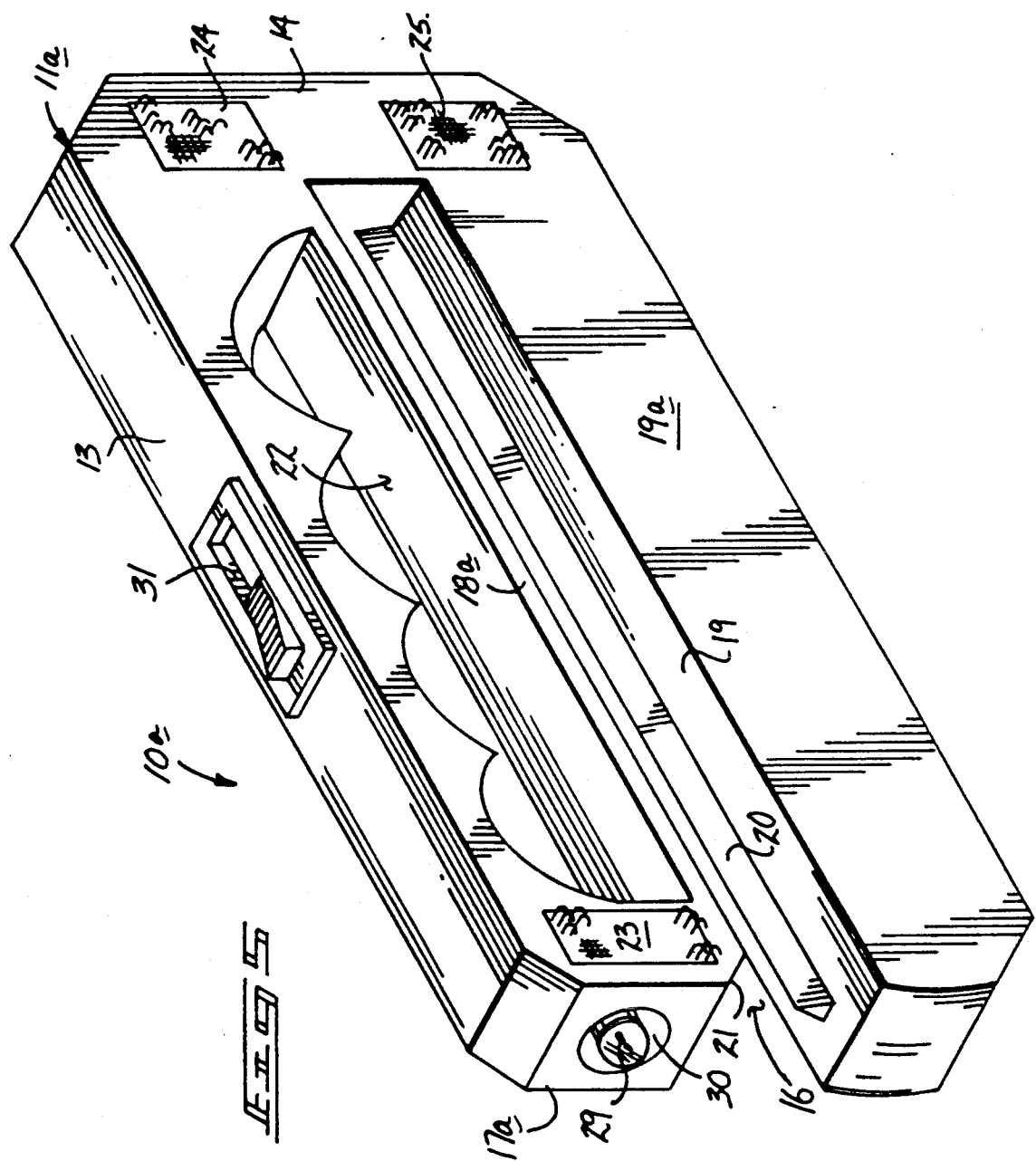

CUTTER HAVING A SINGLE BLADE FOR A SAFETY BELT

BACKGROUND OF THE INVENTION

1. Field of the Invention

The field of invention relates to seat belt apparatus, and more particularly pertains to a new and improved seat belt escape apparatus wherein the same permits emergency severing of a seat belt to permit escape therefrom.

2. Description of the Prior Art

The use of seat belts in automotive environments has greatly enhanced the safety of individuals in the operation of motor vehicles. Unfortunately, during certain emergency situations, individuals contained within an associated automobile are required to effect rapid escape due to such conditions that may exist, such as gas tank explosion and the like. A prior art apparatus for providing emergency escape from a seat belt may be found in U.S. Pat. No. 4,815,211 wherein a sheath is mounted to an associated support within a passenger compartment for retractable securement of a blade member and an associated handle secured thereto.

U.S. Pat. No. 1,749,236 to Stringfellow sets forth a knife construction, wherein the knife is mounted within an associated tubular like handle.

U.S. Pat. Nos. 3,345,743 to Paulson, et al. and 4,558,516 to Collins are further examples of knife structure that may be utilized in a severing procedure, but lack the convenience and accessiblity as well as a "V" shaped cavity to receive a seat belt therewithin.

As such, it may be appreciated that there continues to be a need for a new and improved seat belt escape apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of seat belt apparatus now present in the prior art, the present invention provides a seat belt escape apparatus wherein the same permits convenient access of the organization to effect severing of the seat belt during emergency situations. As such, the general purpose of the present invention, which will be described subsequently in greater detail, is to provide a new and improved seat belt escape apparatus which has all the advantages of the prior art seat belt apparatus and none of the disadvantages.

To attain this, the present invention provides an apparatus wherein a unitary housing includes a "V" shaped slot defining an upper and lower planar wall, with an acute angle therebetween. The lower planar wall includes a blade member arranged essentially coextensively therewith, with the slot arranged for receiving a seat belt for emergency severing thereof. A plurality of hook and loop fasteners mounted to a first side wall of the housing is selectively and removably securable to a like plurality of hook and loop fasteners mounted to an associated seat belt. The organization may further include an illumination member mounted to a forward end wall of the housing operative through a switch for use with the organization during conditions of limited available light.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seat belt escape apparatus which has all the advantages of the prior art seat belt apparatus and none of the disadvantages.

It is another object of the present invention to provide a new and improved seat belt escape apparatus which may be easily and efficiently manufactured and marketed.

It is a further object of the present invention to provide a new and improved seat belt escape apparatus which is of a durable and reliable construction.

An even further object of the present invention is to provide a new and improved seat belt escape apparatus which is susceptible of a low cost of manufacture with regard to both materials and labor, and which accordingly is then susceptible of low prices of sale to the consuming public, thereby making such seat belt escape apparatus economically available to the buying public.

Still yet another object of the present invention is to provide a new and improved seat belt escape apparatus which provides in the apparatuses and methods of the prior art some of the advantages thereof, while simultaneously overcoming some of the disadvantages normally associated therewith.

Still another object of the present invention is to provide a new and improved seat belt escape apparatus wherein the same is removably mounted in association with a seat belt to permit ease of access of the organization to effect severing of the associated seat belt as required.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of a modified housing utilized by the instant invention.

DESCRIPTION OF THE PREFERRED EMBODIMENT

Figure 1:
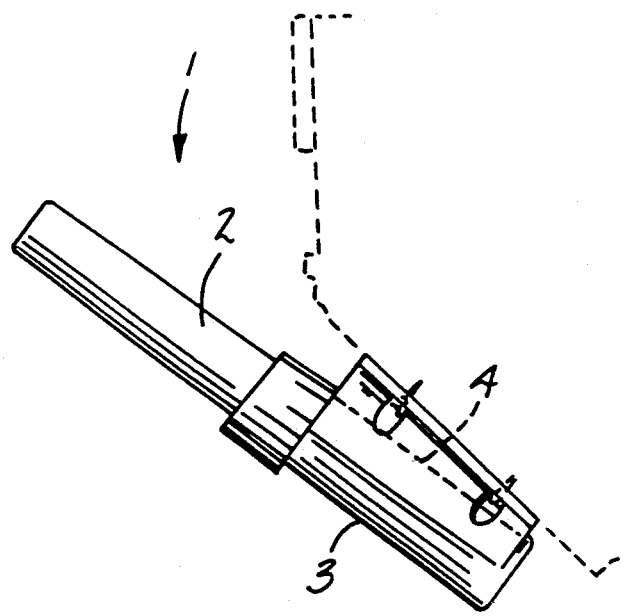
FIG. 1 is an orthographic side view, taken in elevation, of a prior art seat belt cutter apparatus.
Figure 2:
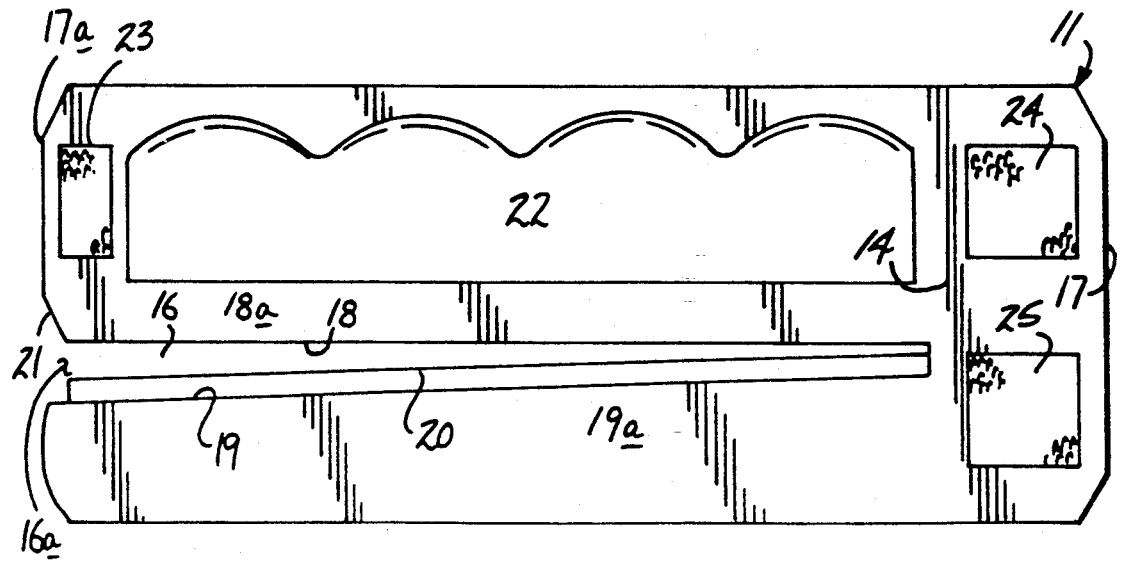
FIG. 2 is an orthographic side view, taken in elevation, of the instant invention.
Figure 3:
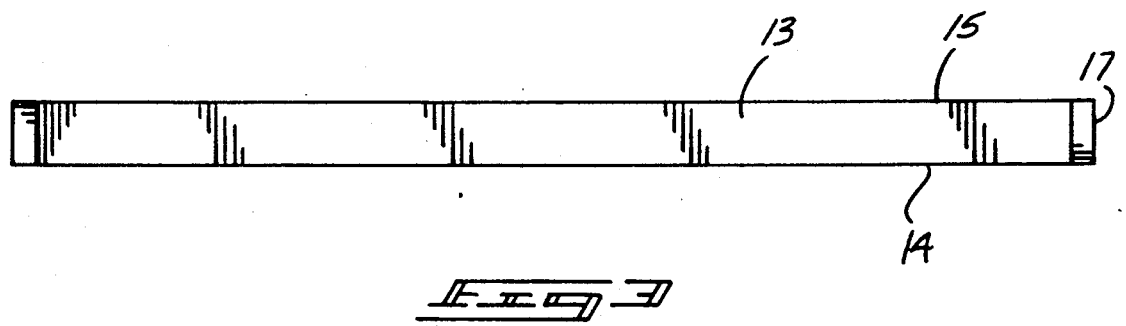
FIG. 3 is an orthographic top view of the instant invention.

With reference now to the drawings, and in particular to FIGS. 1 to 5 thereof, a new and improved seat belt escape apparatus embodying the principles and concepts of the present invention and generally designated by the reference numeral 10 will be described.

FIG. 1 illustrates a prior art seat belt cutter apparatus 1, wherein a handle 2 is mounted within a sheath 3 that is in turn secured to an interior portion of the passenger compartment. The sheath 3 includes an extension of the handle mounting a blade 4 to provide access of the blade in use in severing of a remotely positioned seat belt.

Figure 4:
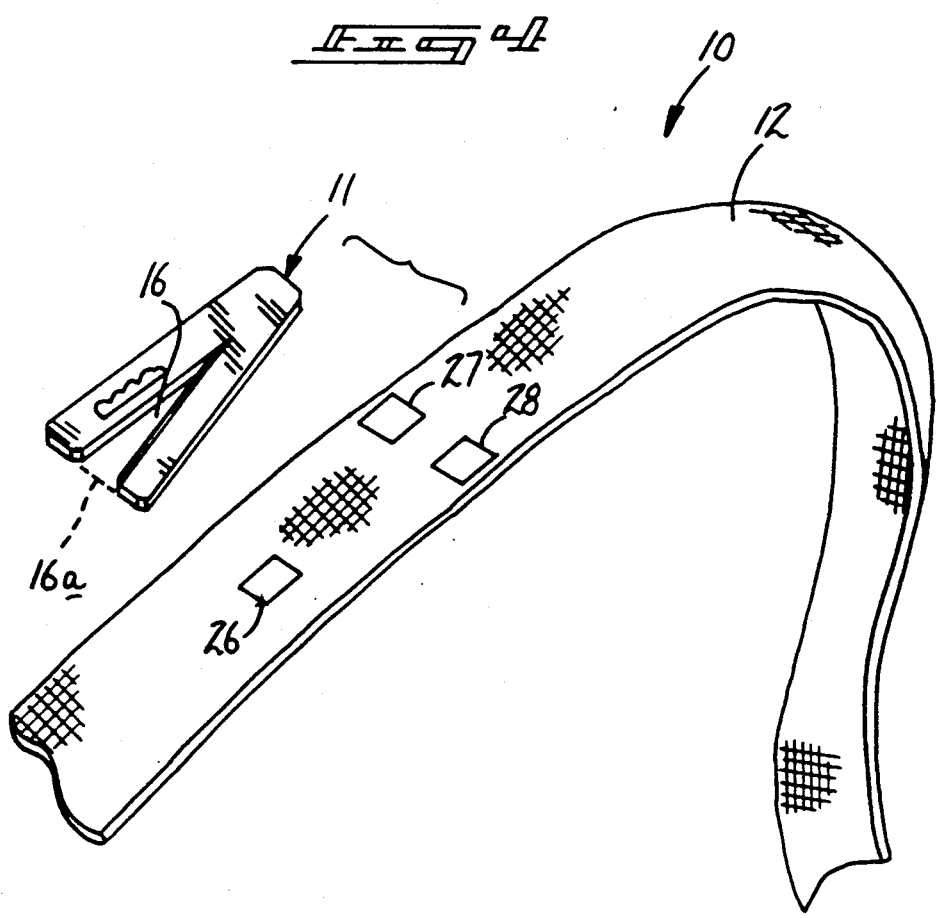
FIG. 4 is an isometric illustration of the instant invention including an associated seat belt.

More specifically, the seat belt escape apparatus 10 of the instant invention essentially comprises a unitary housing 11 selectively securable to an associated flexible seat belt 12, in a manner as set forth in FIG. 4 for example. The unitary housing 11 includes a top wall 13, a first side wall 14 spaced from and parallel to a second side wall 15, with a rear end wall 17 spaced from a forward end wall 17a. A "V" shaped cavity 16 projects interiorly of the housing orthogonally between the first and second side walls 14 and 15 and spaced from the rear end wall 17. The "V" shaped cavity 16 defines an entrance opening 16a tapering rearwardly into an apex to define a generally acute angle between an upper planar jaw wall 18 and a lower planar jaw wall 19 that are arranged orthogonally relative to the first and second side walls 14 and 15, with the acute angle defined between the upper and lower planar jaw walls 18 and 19. The "V" shaped cavity 16 defines spaced rigid jaws 18a and 19a respectively defining the respective upper and lower planar jaw walls 18 and 19. A cutting blade 20 is orthogonally mounted substantially coextensively with the lower planar jaw wall 19. A tapered entrance surface 21 is formed between the forward end wall 17a of the upper jaw 18a and the upper planar jaw wall 18 to enhance ease of entrance of the seat belt 12 into the "V" shaped cavity 16. A handle opening 22 is orthogonally directed through the upper jaw 18a and includes a serpentine upper surface to enhance grasping by an individual's hand directed therewithin. Further, a first hook and loop housing fastener strip 23 is mounted to the first side wall 14 between the handle opening 22 and the forward end wall 17a. A second and third respective housing fastener strips 24 and 25 are mounted adjacent the rear end wall 17 aligned with the respective upper and lower jaws 18a and 19a also positioned on the first side wall 14. The first, second, and third hook and loop housing fastener strips 23, 24, and 25 are spaced apart in a predetermined pattern for securement to a respective first, second, and third seat belt fastener strip 26, 27, and 28 securable to the respective first, second, and third hook and loop housing fastener strips 23, 24, and 25. The seat belt fastener strips are also set apart a predetermined pattern and fixedly mounted onto the seat belt 12 to provide convenience of securement and access of the housing 11 as required.

FIG. 5 illustrates the use of a modified housing 11 that includes an illumination bulb 29 mounted within a conical cavity 30 directed within the forward end wall 17a and selectively operative through an on/off switch 31 mounted within the top wall 13 for use of the organization during conditions of limited available light.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seat belt escape apparatus comprising, in combination,
   a unitary housing, the unitary housing including a cavity directed therewithin, the cavity including a cutting blade mounted within the cavity, and
   further including a flexible seat belt, the flexible seat belt including first fastening means, and
   the unitary housing including second fastening means for securement of the unitary housing to the first fastening means by the second fastening means, and
   wherein the housing includes a top wall, a first side wall spaced from and parallel to a second side wall, a rear end wall, and a forward end wall, the cavity defined by a "V" shaped cavity defining an upper planar jaw wall and a lower planar jaw wall, the upper and lower planar jaw walls arranged orthogonally relative to the first and second side walls and defining an acute angle between the upper planar jaw wall and the lower planar jaw wall, and the cutting blade orthogonally and fixedly mounted to the lower planar jaw wall, and
   wherein the first fastening means includes a plurality of seat belt fastener strips fixedly mounted to the seat belt, and the second fastening means includes a plurality of hook and loop housing fastening strips mounted to the first side wall of the housing, and further including a handle opening directed coextensively through the first side wall and the second wall between the top wall of the housing and the upper planar jaw wall, and the handle opening including a serpentine upper surface adapted for enhanced manual grasping of the housing.

2. An apparatus as set forth in claim 1 wherein the "V" shaped cavity defines a tapered entrance opening between the forward end wall and the upper planar jaw wall to enhance ease of access of the seat belt within the "V" shaped cavity.

* * * * *